US007184922B2

(12) United States Patent
Ousley et al.

(10) Patent No.: US 7,184,922 B2
(45) Date of Patent: Feb. 27, 2007

(54) MEASUREMENT DEVICE THAT APPEARS TO A COMPUTER SYSTEM AS A FILE STORAGE DEVICE

(75) Inventors: Timothy H. Ousley, Austin, TX (US); Mike Muecke, Austin, TX (US); Robert Watzlavick, Austin, TX (US)

(73) Assignee: National Instruments Corporation, Austin, TX (US)

( * ) Notice: Subject to any disclaimer, the term of this patent is extended or adjusted under 35 U.S.C. 154(b) by 63 days.

(21) Appl. No.: 11/068,547

(22) Filed: Feb. 28, 2005

(65) Prior Publication Data

US 2006/0047465 A1 Mar. 2, 2006

Related U.S. Application Data

(60) Provisional application No. 60/605,205, filed on Aug. 27, 2004.

(51) Int. Cl.
*G01D 1/00* (2006.01)

(52) U.S. Cl. .......................... 702/127; 702/57; 702/77; 702/121; 702/122; 702/123; 702/188; 702/189; 710/8; 710/72; 710/74

(58) Field of Classification Search ................ 702/127, 702/57, 77, 121–123, 188, 189; 710/8, 13, 710/22, 72–74
See application file for complete search history.

(56) References Cited

U.S. PATENT DOCUMENTS

| | | | | |
|---|---|---|---|---|
| 5,987,530 | A | 11/1999 | Thomson | |
| 6,073,205 | A | 6/2000 | Thomson | |
| 6,412,028 | B1 * | 6/2002 | Steed et al. | 710/22 |
| 6,789,030 | B1 | 9/2004 | Coyle et al. | |

* cited by examiner

*Primary Examiner*—Marc S. Hoff
*Assistant Examiner*—Phuong Huynh
(74) *Attorney, Agent, or Firm*—Meyertons Hood Kivlin Kowert & Goetzel, P.C.; Jeffrey C. Hood; Jason L. Burgess

(57) ABSTRACT

A measurement device operable to communicate with a computer system via files. The computer system may receive one or more files created by the measurement device, where the files include measurement data generated by the measurement device and may utilize the files to perform a measurement application. The measurement device may also be operable to receive a configuration file from the computer system and configure or control itself according to commands or settings therein. In one embodiment the measurement device may appear to the computer system as a USB Mass Storage device, and the files created by the measurement device may appear as files stored on a USB Mass Storage device. Thus, the computer system may communicate with the measurement device to obtain the measurement data files in the same standard manner in which it would obtain files stored on any other USB Mass Storage device.

33 Claims, 4 Drawing Sheets

MEASUREMENT DEVICE THAT APPEARS TO A COMPUTER SYSTEM AS A FILE STORAGE DEVICE

PRIORITY CLAIM

This application claims benefit of priority of U.S. Provisional Application Ser. No. 60/605,205 titled “Measurement Device that Appears to a Computer System as a USB Mass Storage Device”, filed Aug. 27, 2004, whose inventors were Timothy H. Ousley, Mike Muecke, and Robert Watzlavick.

FIELD OF THE INVENTION

The present invention relates to the field of computer-based test and measurement systems, and more particularly relates to a measurement device operable to provide measurement data to a computer system via a measurement data file. In one embodiment the measurement device may appear to the computer system as a USB Mass Storage device, or other file storage device, on which the measurement data file is stored.

DESCRIPTION OF THE RELATED ART

Scientists and engineers often use test, measurement, or automation systems to perform a variety of functions, including measurement of a physical phenomenon or unit under test (UUT), test and analysis of physical phenomena, simulation, hardware-in-the-loop testing, process monitoring and control, control of mechanical or electrical machinery, data logging, and laboratory research, to name a few examples. The devices that interact with the physical systems under analysis may be collectively referred to as “measurement devices”.

Measurement devices are often used in conjunction with computer systems. The computer system receives measurement data from the measurement device and performs much of the processing, analysis, or control for the application. Some configuration is usually necessary to make the measurement device work together correctly with the computer system. For example, many measurement devices require specific drivers to be installed on the computer system to enable communication with the measurement device.

However, scientists and engineers are often not highly trained in the art of computer system configuration. Installing the measurement device and associated drivers on the computer system can be a difficult and time-consuming task. Also, the necessary drivers for the measurement device are sometimes not readily available (e.g., when the measurement device is moved to a location in the field and the driver installation CD becomes lost or damaged), which can result in downtime of the measurement system.

Another disadvantage associated with the traditional approach of requiring specific drivers for measurement devices is the cost of developing the drivers. Measurement device vendors may have to develop and test drivers for multiple operating systems and may also have to maintain the drivers or develop new ones as the operating systems evolve. Therefore it would be desirable to enable a computer system to communicate with a measurement device without requiring the use of specialized drivers.

The Universal Serial Bus (USB) technology that has become widespread in recent years simplifies the task of installing some devices on computer systems. When a device is connected to a host computer's USB bus, the device is immediately recognized by the host computer, dynamically enumerated, and assigned an address. The host computer and the device then perform a query/response protocol to enable the host computer to obtain information about the device, such as the class of device and various other details that the host computer needs to know for its operation.

The USB standards define various broad device classes for certain well-known kinds of devices, such as “Printer”, “Human Interface Device”, “Audio”, “Video”, “Mass Storage”, etc. Operating systems that support USB technology typically include pre-loaded drivers for these USB device classes. If a new USB device connected to the host computer belongs to one of these USB device classes then the host computer can often simply configure communication with the new device to occur using the driver for the appropriate USB device class. Thus, the user is not required to install a driver specifically for the device, and a vendor is not required to develop a driver specifically for the device.

As mentioned above, one standard USB device class is “Mass Storage”. A USB Mass Storage device can typically store files received from the host computer and/or store files for receipt by the host computer. Operation of USB Mass Storage devices is defined by various documents, such as the “Universal Serial Bus Mass Storage Class Control/Bulk/Interrupt (CBI) Transport” specification and the “Universal Serial Bus Mass Storage Class Bulk-Only Transport” specification.

SUMMARY OF THE INVENTION

According to one embodiment of the invention, a computer system may receive measurement data from a measurement device via one or more files generated by the measurement device. The measurement device may be coupled to the computer system and may receive a signal from a physical system or unit under test and generate measurement data based on the signal. The measurement device may be operable to create one or more files based on the measurement data it generates.

The files may comprise files of any kind and may be structured in any desired way. In one embodiment the files may be simple files that simply represent the measurement data itself, e.g., as binary files comprising binary values representing the measurement data values or human-readable text files indicating the measurement data values. In another embodiment the files may be more structurally complex or may include elements other than the measurement data. For example, the measurement device may be operable to generate: spreadsheet files for particular spreadsheet programs, where the spreadsheet files include the measurement data; HTML, XML, or other markup language files that include the measurement data; a file representing a graph, where the graph visually indicates the measurement data; an executable program file that utilizes the measurement data; etc. These files may also include elements other than the measurement data. For example, an HTML file generated by the measurement device may not only include the measurement data but may also include text or graphic elements, e.g., as in a report file.

Thus, in one embodiment the measurement device may differ from traditional measurement devices in that it not only acquires/generates the raw measurement data but also applies a higher-level structuring to the measurement data and/or generates one or more files based on the measurement data.

A measurement application program executing on the computer system may receive the one or more files generated by the measurement device and may read or analyze the files to perform the desired measurement function. In one embodiment the measurement application program may possess knowledge of what kind of files are generated by the measurement device and may be operable to utilize these files accordingly, e.g., to obtain, process, display and/or store the included measurement data. In the prior art, measurement application programs typically do not receive measurement data in the form of files, but rather communicate with measurement devices to receive raw measurement data.

The file(s) generated by the measurement device may be stored in memory on the measurement device or may be dynamically generated as they are read by the computer system.

In one embodiment the measurement device may also be operable to receive files from the computer system. In one embodiment the measurement device may be configured via a configuration file received from the computer system. For example, a user or application on the computer system may create a configuration file that includes various commands, settings, or attributes related to the configuration or operation of the measurement device. In response to the configuration file being sent from the computer system to the measurement device, the measurement device may be operable to analyze the configuration file and configure or control itself according to the commands, settings, or attributes therein.

In various embodiments, the measurement device may be coupled to the computer system in any of various ways, and the computer system may communicate with the measurement device using any technique to receive files generated by the measurement device or send files to the measurement device. According to one embodiment, the measurement device may comprise a USB device coupled to a USB bus of the computer system. In particular, in one embodiment the measurement device may appear to the computer system as a USB Mass Storage device, and the files generated by the measurement device may appear as files stored on a USB Mass Storage device. Thus, the computer system may communicate with the measurement device to obtain the generated files in the same standard manner in which it would obtain files stored on any other USB Mass Storage device.

The computer system may execute an operating system that provides support for detecting and communicating with USB devices. In particular, the operating system may include software, e.g., a driver, for communicating with USB Mass Storage devices. In response to the measurement device being connected to the computer system, the computer system may initiate a query/response protocol with the measurement device to obtain information about the measurement device. The measurement device may inform the computer system that it belongs to the USB "Mass Storage" device class, as well as provide other details that the computer system needs to know to communicate with the measurement device. The computer system may then configure itself to communicate with the measurement device as a USB Mass Storage device. For example, in one embodiment the computer system may be operable to read measurement data files from a memory of the measurement device using standard communication techniques for reading files from USB Mass Storage devices. Similarly, in one embodiment the computer system may write a configuration file or other file to a memory of the measurement device using standard communication techniques for writing files to USB Mass Storage devices.

Thus, in an embodiment in which the measurement device conforms to USB Mass Storage specifications, the measurement device may advantageously be installed on the computer system without requiring a special driver for the measurement device to be installed. This may be advantageous to the user in that he can easily and quickly set up the measurement device on any computer system with an operating system that supports USB devices, without needing to possess or install specialized drivers for the measurement device.

BRIEF DESCRIPTION OF THE DRAWINGS

A better understanding of the present invention can be obtained when the following detailed description of the preferred embodiment is considered in conjunction with the following drawings, in which.

Figure 1:
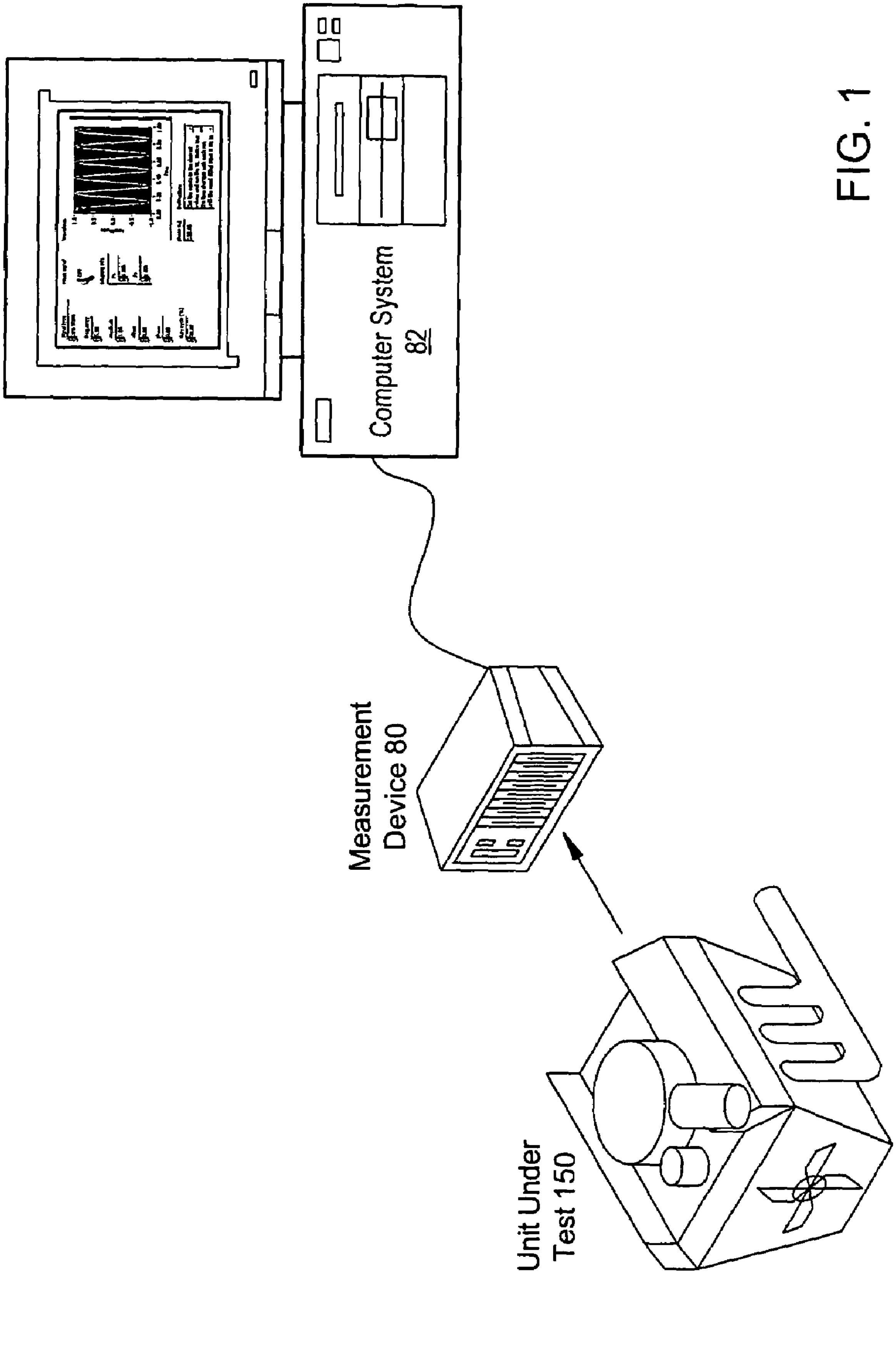
FIG. 1 illustrates a measurement device coupled to a computer system, where the computer system receives measurement data from the measurement device via one or more files.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage, or other type of memory such as FLASH, EEPROM, etc. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI elements, or may comprise a plurality of individual GUI elements (or individual windows each having one or more GUI elements), wherein the individual GUI elements or windows may optionally be tiled together.

Graphical User Interface Element (GUI element)—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a datalogger, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may connect to a host computer or computers during, before, and/or after acquiring data, or may never connect to a host computer.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Measurement Data—data generated by a measurement device. For example, the measurement device may receive a signal from a unit under test or a physical system and may generate measurement data based on the signal. The measurement device may be coupled to another device, e.g., a computer system, that receives the measurement data generated by the measurement device.

Live measurement data—measurement data that is generated continuously or quasi-continuously by a measurement device. For example, live measurement data may comprise a stream of data elements (e.g., floating point numbers or other elements) generated in rapid succession by the measurement device. Examples of live measurement data include data that is generated in real time based on a physical signal, e.g., where data values are generated in a live or streaming manner. One specific example of live measurement data is data that represents a continuous waveform.

FIG. 1—Computer System

FIG. 1 illustrates a computer system 82 operable to execute a program that performs a measurement function. This program is also referred to herein as a "measurement application program". As shown, a measurement device 80 may be coupled to the computer system 82. The measurement device 80 may receive a signal from a physical system or unit under test 150 and may generate measurement data based on the signal. In various embodiments, the measurement device 80 may generate measurement data based on any of various kinds of signals received from any of various kinds of physical systems or units under test 150.

The measurement application program executing on the computer system 82 may receive the measurement data generated by the measurement device 80 and may utilize the measurement data to perform the measurement function. The measurement data may be utilized to perform any of various kinds of measurement functions, such as test and/or analysis of the physical system or unit under test 150, simulation, hardware-in-the-loop testing, process monitoring and control, control of mechanical or electrical machinery, data logging, laboratory research, etc.

According to one embodiment, the measurement device 80 may be operable to generate one or more files based on the measurement data it generates. The files may comprise files of any kind and may be structured in any desired way. In one embodiment the files may be simple files that simply represent the measurement data itself, e.g., as binary files comprising binary values representing the measurement data values or human-readable text files indicating the measurement data values.

In another embodiment the files may be more structurally complex or may include elements other than the measurement data. For example, the measurement device 80 may be operable to generate: spreadsheet files for particular spreadsheet applications, where the spreadsheet files include the measurement data; HTML, XML, or other markup language files that include the measurement data; a file representing a graph, where the graph visually indicates the measurement data; an executable program file that utilizes the measurement data; etc. These files may also include elements other than the measurement data. For example, an HTML file generated by the measurement device 80 may not only include the measurement data but may also include text or graphic elements, e.g., as in a report file. Thus, in one embodiment the measurement device 80 may differ from traditional measurement devices in that it not only generates the raw measurement data but also applies a higher-level structuring and/or interpretation to the measurement data and generates a file based on the measurement data.

The measurement application program executing on the computer system 82 may receive the one or more files generated by the measurement device 80 and may read or analyze the files to perform the desired measurement function. The measurement application program may possess knowledge of what kind of files are generated by the measurement device 80 and may be operable to utilize these files accordingly, e.g., to obtain, process, display and/or store the included measurement data. In the prior art, measurement application programs typically do not receive measurement data in the form of files, but rather communicate with measurement devices to receive raw measurement data.

In various embodiments, the measurement device 80 may be coupled to the computer system 82 in any of various ways, and the computer system 82 may communicate with the measurement device 80 using any technique to receive the files generated by the measurement device 80. According to one embodiment, the measurement device 80 may comprise a USB device coupled to a USB bus of the computer system 82. In particular, in one embodiment the measurement device 80 may appear to the computer system 82 as a USB device of a first type, e.g., as a USB Mass Storage device, and the files generated by the measurement device 80 may appear as files stored on a USB Mass Storage device. Thus, the computer system 82 may communicate with the measurement device 80 to obtain the generated files in the same standard manner in which it would obtain files stored on any other USB Mass Storage device. Embodiments in which the measurement device 80 appears as a USB Mass Storage device are described in further detail below.

As used herein, the term USB is intended to include prior, current, and future versions of the Universal Serial Bus (USB) standard and similar standards.

In another embodiment the measurement device 80 may not appear to the computer system 82 as a USB Mass Storage device but may appear as another type of file storage device, e.g., a file storage device that uses communication standards other than USB. As used herein, a file storage device may comprise a device that appears to a computer system as a device on which files can be stored and/or from which files can be received. For some types of file storage devices, the computer system may be able to automatically detect connection of the file storage device to the computer system and may be operable to automatically configure itself to communicate with the file storage device, e.g., by using a standard file storage device driver provided by or built in to the operating system of the computer system.

Referring again to FIG. 1, the computer system 82 may include a display device. For example, FIG. 1 shows a GUI of the measurement application program displayed on the display device of the computer system 82. The computer system 82 may also include a memory medium(s) on which programs or software components may be stored. For example, the memory medium may store the measurement application program executed by the computer system 82. The memory medium may also store operating system software. For example, the operating system may provide support for automatically detecting and communicating with USB devices or other kinds of devices. In particular, the operating system may include software, e.g., a driver, for communicating with USB Mass Storage devices or other file storage devices. Thus, in an embodiment in which the measurement device 80 conforms to USB Mass Storage specifications or other standard file storage device specifications, the measurement device 80 may advantageously be installed on the computer system 82 without requiring a special driver for the measurement device 80 to be installed, as described below.

Figure 2:
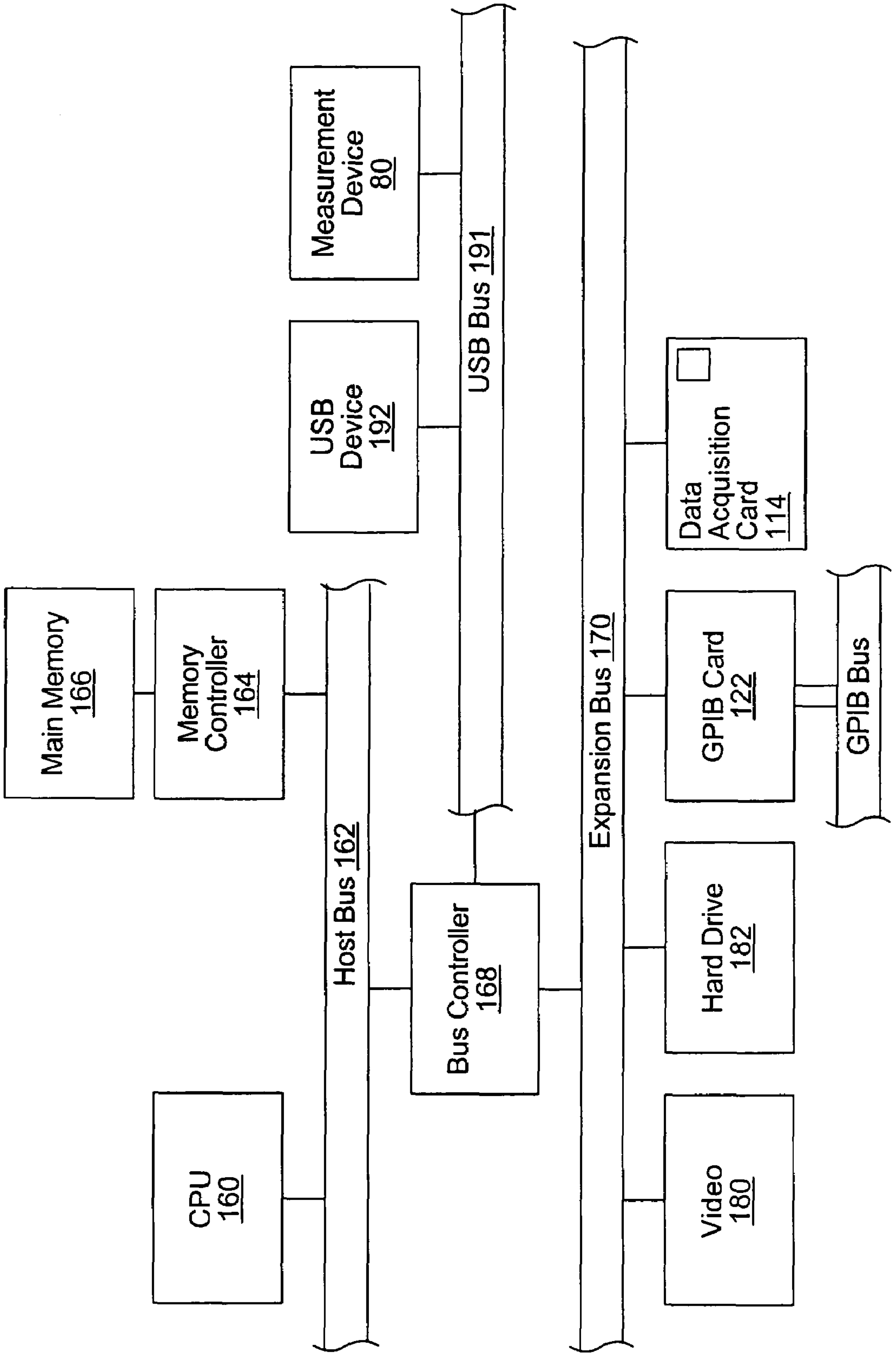
FIG. 2 is a block diagram representing one embodiment of the computer system illustrated in FIG. 1.

FIG. 2—Computer System Block Diagram

FIG. 2 is a block diagram representing one embodiment of the computer system 82 illustrated in FIG. 1. It is noted that any type of computer system configuration or architecture can be used as desired, and FIG. 2 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a measurement application program such as described above with reference to FIG. 1. The main memory may also store operating system software, as well as other software for operation of the computer system.

In one embodiment, a Universal Serial Bus (USB) 191 may also be coupled to the computer system, e.g., through a bus controller 168 or bus bridge logic. Various kinds of USB devices may be coupled to the computer system 82 via the USB bus 191. For example, FIG. 2 illustrates USB Device 192 coupled to the USB bus 191, which may be a USB device of any kind. As shown, and as described above, the measurement device 80 may also be coupled to the computer system 82 via the USB bus 191 in one embodiment. In various embodiments the measurement device 80 may be coupled to the USB bus 191 in various ways, e.g., via a USB cable or other connection mechanism.

An expansion or input/output bus 170 may also be coupled to the host bus 162 by means of a bus controller 168 or bus bridge logic. The expansion bus 170 may be the PCI (Peripheral Component Interconnect) expansion bus, although other bus types can also be used. The expansion bus 170 may include slots for various devices. The computer 82 further comprises a video display subsystem 180 and hard drive 182 coupled to the expansion bus 170. In the illustrated embodiment, the computer system 82 also couples to measurement devices other than the measurement device 80. A data acquisition card 114 is shown coupled to the expansion bus 170, as well as a GPIB card 122 which couples to a GPIB bus.

Although not shown in FIG. 2, a network interface card or other network device may also be coupled to the computer 82, which may enable the computer 82 to communicate with other devices via a network such as the Internet, or an Intranet or LAN. In one embodiment, the measurement device 80 may generate files based on measurement data as described above, but may be located remotely from the computer 82, i.e., may couple to the computer 82 via the network. In this embodiment, the computer 82 may receive the files generated by the measurement device 80 via the network. In one embodiment the computer 82 may also send one or more files to the measurement device 80 via the network, e.g., may send a configuration file such as described below.

Figure 3:
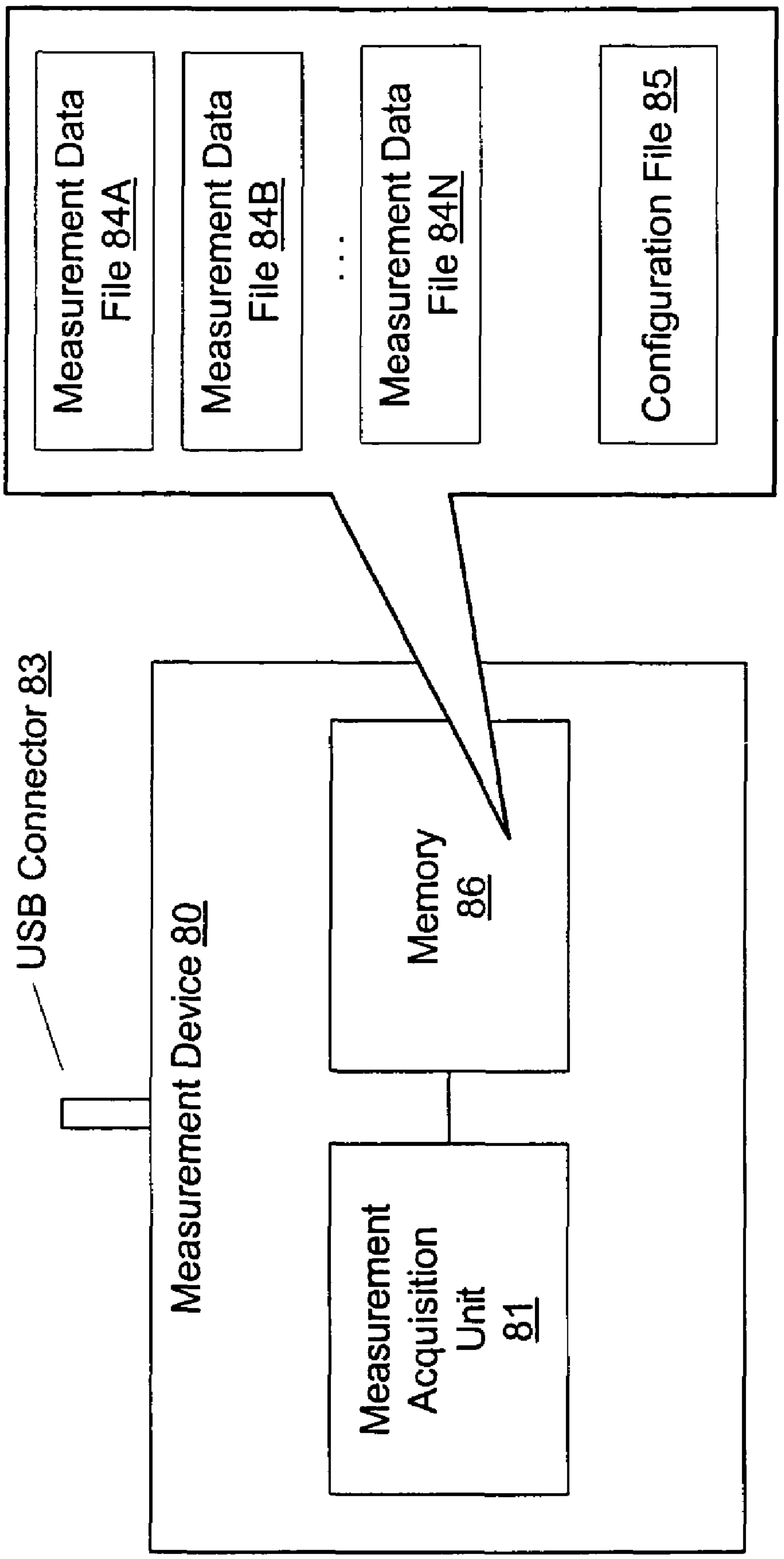
FIG. 3 is a block diagram representing one embodiment of the measurement device illustrated in FIG. 1, in which the measurement device comprises a USB device.

FIG. 3—Measurement Device Block Diagram

FIG. 3 is a block diagram representing one embodiment of the measurement device 80. It is noted that FIG. 3 represents an exemplary embodiment, and alternative architectures are contemplated. As shown, the measurement device 80 may include a measurement acquisition unit 81. The measurement acquisition unit 81 may couple to a physical system or unit under test 150 to receive signals (typically generated by transducers) and may generate measurement data based on the signals, as described above with reference to FIG. 1.

In various embodiments, the measurement acquisition unit 81 may comprise hardware of any kind, depending on the kind of measurement device 80, i.e., depending on the type of signal acquired and type of measurement data generated. The measurement acquisition unit 81 may comprise a device of any kind or may conform to any of various instrumentation standards, such as a data acquisition device with associated signal conditioning circuitry, a GPIB instrument, a VXI instrument, a PXI instrument, a video device or camera with associated image acquisition (or machine vision) hardware, or a motion control device, to name a few examples.

The measurement acquisition unit 81 may also be configured to generate files based on the generated measurement data, as described above. In one embodiment the measurement device 80 may include a memory 86, and the generated files may be stored in the memory 86. For example, FIG. 3 illustrates an embodiment in which various measurement data files 84 are stored in the memory 86.

In one embodiment the measurement device 80 may also be operable to receive files from an external source, e.g., from the computer system 82 described above. The files may be stored in the memory 86. In one embodiment the measurement device 80 may be configured via a configuration file 85 stored in the memory 86. For example, a user or application on the computer system 82 may create a configuration file 85 that includes various commands, settings, or attributes related to the configuration of the measurement device 80. In response to the configuration file 85 being sent from the computer 82 to the measurement device 80, the measurement device 80 (e.g., the measurement acquisition unit 81) may be operable to analyze the configuration file 85 and configure or control itself according to the commands, settings, or attributes therein.

In various embodiments the memory 86 may comprise a memory medium of any kind. In one embodiment the memory 86 may comprise flash memory. In other embodiments the memory 86 may comprise any other type of memory suitable for storing files, such as RAM, magnetic media, etc.

In one embodiment the measurement device 80 may be engineered so that the memory 86 is detachable from the measurement device 80. Detaching the memory 86 may enable users to replace the memory 86 with another memory 86. This may provide various advantages to users. For example, in one embodiment the memory 86 may comprise a standard and commonly available memory component, such as a Compact Flash™ component, a Memory Stick® component, a Smart Media™ component, an SDCard, a microdrive, a USB memory key, etc. The measurement device 80 may include a slot or compartment for inserting the standard memory component. Such standard memory components are available in different sizes, e.g., 128 MB, 256 MB, 512 MB, 1 GB, etc. Different measurement applications may require different amounts of memory, e.g., depending on factors such as the amount of measurement data generated, the rate at which the measurement application program consumes the measurement data, etc. Thus, if the memory 86 is a detachable and commonly available memory component then the user can purchase and attach a memory component of any appropriate size to the measurement device 80. This may also lower the device vendor's cost to produce the measurement device 80 and lower the user's cost to purchase the measurement device 80 since the user may be able to purchase the measurement device 80 without memory and re-use a standard memory component already in his possession as the memory 86.

In an alternative embodiment the measurement device 80 may not have a memory 86 for storing files. For example, instead of generating files based on the measurement data and storing them in a memory, the measurement device 80 may be operable to dynamically construct files in response to requests from the computer system 82, e.g., where a dynamically constructed file is based on recently generated measurement data. Thus, the measurement device 80 may not have a file system or memory 86 on which files are stored per se, but instead may dynamically generate files as they are requested and stream them to the computer system 82. Similarly as described above, files that are dynamically generated in this manner may comprise files of any kind, may be structured in any desired way, and may possibly include elements other than measurement data.

As described above, in one embodiment the measurement device 80 may couple to the computer system 82 as a USB Mass Storage device or other standard type of file storage device. Thus, the computer system 82 may read files from the memory 86 and possibly write files to the memory 86 using standard communication techniques for communicating with USB Mass Storage devices or other file storage devices. As shown in the embodiment of FIG. 3, the measurement device 80 may include a USB connector 83 by which the measurement device 80 can connect to the computer system 82, e.g., via a cable connecting the USB connector 83 to a USB port or hub of the computer system 82. In other embodiments the measurement device 80 may couple to the computer system 82 in ways other than as a USB Mass Storage device.

FIG. 4—Flowchart

Figure 4:
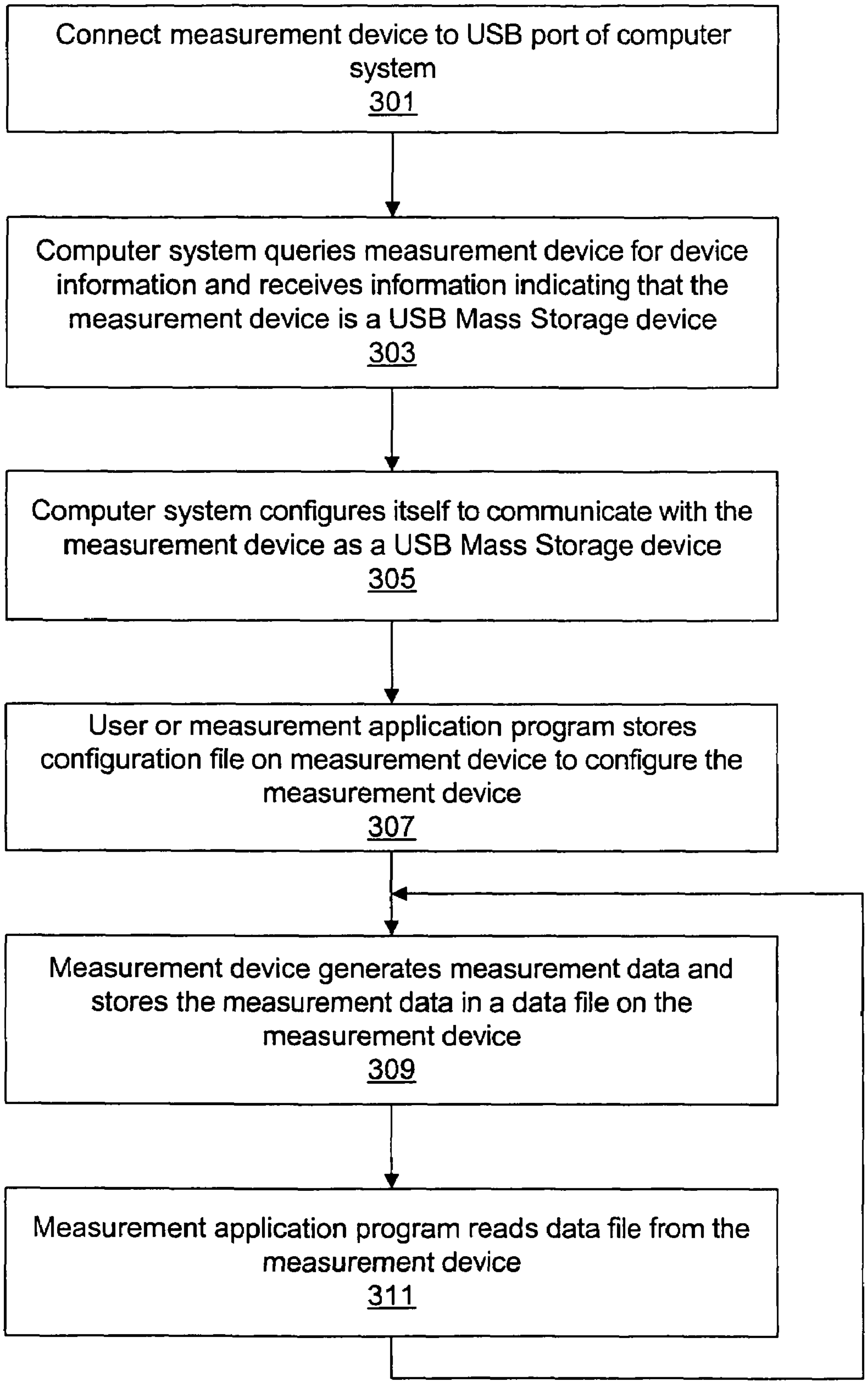
FIG. 4 is a flowchart diagram illustrating one embodiment of a method for utilizing the measurement device in a measurement application.

FIG. 4 is a flowchart diagram illustrating one embodiment of a method for utilizing the measurement device 80 in a measurement application. It is noted that FIG. 4 illustrates a representative embodiment in which the measurement device 80 appears to the computer system 82 as a USB Mass Storage device, and alternative embodiments are contemplated. Also, various elements may be combined, omitted, or performed in different orders.

In 301, the measurement device 80 may be connected to a USB port or hub of the computer system 82.

In 303, in response to the measurement device 80 being connected, the computer system 82 may initiate a query/response protocol with the measurement device 80 to obtain information about the measurement device 80. The measurement device 80 may inform the computer system 82 that it belongs to the USB "Mass Storage" device class, as well as providing other details that the computer system 82 needs to know to communicate with the measurement device 80.

In 305, the computer system 82 may configure itself to communicate with the measurement device 80 as a USB Mass Storage device. As described above, the computer system 82 may execute an operating system that provides built-in support for USB devices, including USB Mass Storage devices. Thus, 305 may involve the computer system 82 configuring itself to communicate with the measurement device 80 using its standard driver for USB Mass Storage devices. This may be advantageous to the user in that he can easily and quickly set up the measurement device 80 on any computer system with an operating system that supports USB devices, without needing to possess or install specialized drivers for the measurement device 80.

As shown in 307, in one embodiment the user or a measurement application program executing on the computer system 82 may store a configuration file on the measurement device 80, e.g., in the memory 86, to configure the measurement device 80. For example, as described above, in one embodiment the computer system 82 may write the configuration file to the memory 86 of the measurement device 80 using standard communication techniques for writing files to USB Mass Storage devices.

The configuration file may include various commands, settings, or attributes related to the configuration of the measurement device 80. In response to the configuration file being stored on the measurement device 80, the measurement device 80 may be operable to analyze the configuration file and configure itself according to the commands, settings, or attributes therein. For example, depending on the type of measurement device 80, the configuration file may specify properties such as acquisition rate, coupling, gain, scaling, channels, or trigger conditions.

In 309, the measurement device 80 may generate measurement data, e.g., based on one or more signals received from a physical system or unit under test 150, and in one embodiment may store the measurement data in a measurement data file on the measurement device, e.g., in the memory 86. As described above, the measurement data file may comprise a file of any kind, such as: a binary file comprising binary values representing the measurement data; a human-readable text file indicating the measurement data; a spreadsheet file for a particular spreadsheet application, where the spreadsheet file includes the measurement data; an HTML, XML, or other markup language file that includes the measurement data; a file including a graph or image, where the graph or image visually indicates the measurement data; an executable program file that utilizes the measurement data; etc.

In 311, a measurement application program executing on the computer system 82 may read the measurement data file from the measurement device 80. For example, as described above, in one embodiment the computer system 82 may read the measurement data file from the memory 86 of the measurement device 80 using standard communication techniques for reading files from USB Mass Storage devices, e.g., using a standard driver for USB Mass Storage devices and without requiring a device driver specific to the measurement device 80.

The measurement application program may be operable to process or access the measurement data file in any way, depending on the particular measurement application and the type of measurement data file. For example, in one embodiment the measurement application program may analyze the measurement data file to obtain the measurement data, may display the measurement data in a GUI on a display device of the computer system 82, may utilize the measurement data to perform tests of the physical system or unit under test 150, and/or may store the measurement data in persistent storage, to name a few examples. The measurement application program may comprise any program which accesses the measurement data file, possibly including a spreadsheet, an HTML browser, a text file editor/viewer, or any other program which accesses the measurement data file. In one embodiment a standard program provided by the operating system of the computer system 82 may be used as the measurement application program to access or view the measurement data file.

As indicated by the arrow returning to 309, 309 and 311 may be performed in a repetitive manner. For example, the measurement device 80 may periodically or repetitively generate measurement data and store or update a measurement data file based on the measurement data. The measurement application program may periodically or repetitively obtain the measurement data file(s) from the measurement device 80.

In one embodiment the measurement device 80 may be operable to generate live measurement data, and 309 and 311 may be repetitively performed in such a way that the measurement application program is able to receive the live measurement data in a continuous or quasi-continuous manner. As described above, live measurement data may comprise a stream of data elements (e.g., floating point numbers or other elements) generated in rapid succession by the measurement device 80, such as data that represents a continuous waveform. The measurement application program may process or utilize the live measurement data in various ways. As one simple example, the live measurement data may be graphed in a GUI element displayed on a GUI of the measurement application program. The graph may scroll over time or may refresh as new live measurement data is received. In one embodiment the graph may appear to the user as a continuously scrolling graph, e.g., similar to the manner in which live measurement data is displayed on a traditional oscilloscope.

In various embodiments, the functionality of 309 and 311 being performed in a repetitive or periodic manner may be implemented in any desired way. Any desired methodology may be utilized to coordinate the activities of the measurement device 80 writing measurement data files and the measurement application program on the computer system 82 reading the measurement data files. In various embodiments, each measurement data file may include any amount of measurement data, and the measurement application program may obtain measurement data files from the measurement device 80 at any rate.

For example, in one embodiment the measurement device 80 may write continuously or write at a rapid rate to update a single measurement data file with newly generated measurement data. Thus, the measurement application program may repetitively read from the measurement data file to obtain recent measurement data. The measurement application program may read from the measurement data file at any rate and may read any amount of data at a time, as appropriate for a particular application.

In another embodiment the measurement device 80 may create multiple measurement data files. For example, the measurement device 80 may be operable to periodically acquire signals from the physical system or unit under test 150, generate measurement data based on the signals, and create a new measurement data file based on the measurement data for each acquisition. Thus, each time the measurement application program on the computer system 82 obtains measurement data from the measurement device 80, it may do so by obtaining a different measurement data file. For example, there may be a file naming convention to enable the measurement application program to know the order in which the measurement data files were generated so that the measurement data files are obtained in the correct order, or other ordering techniques, such as file timestamps, may be utilized for this purpose.

In one embodiment the measurement device 80 may be operable to periodically remove itself from the operating system of the computer system 82 and then re-attach itself. For example, each time the measurement device 80 creates a new measurement data file, it may remove and re-attach itself in this manner. This may have the effect of notifying the computer system 82 that a new measurement data file has been generated. For example, the computer system 82 may be operable to re-discover the measurement device 80 each time it reattaches itself to the operating system, and the new measurement data file may be opened in response.

In an alternative embodiment the measurement device 80 may be operable to provide measurement data files to the measurement application program without actually storing any files on the measurement device 80. For example, as described above with reference to FIG. 3, in one embodiment the measurement device 80 may be operable to dynamically generate measurement data files based on recently generated measurement data in response to requests from the measurement application program and may stream the dynamically generated files to the computer system 82 without the files ever being stored on the measurement device 80.

It is noted that FIG. 4 represents an exemplary embodiment of a method for utilizing the measurement device 80 in a measurement application, and numerous alternative embodiments are contemplated. For example, in one embodiment the measurement application program may be operable to periodically or repetitively send a configuration file or other file to the measurement device 80. For example, the measurement application program may operate in conjunction with the measurement device 80 to perform a process control function. The measurement application program may obtain measurement data files from the measurement device 80, analyze the measurement data in the files, and issue commands to control or provide feedback to the measurement device 80 based on the analysis, where the commands are included in a file sent to the measurement device 80. The measurement device 80 may be operable to read the commands from the file and respond accordingly.

As noted above, FIG. 4 illustrates a representative embodiment in which the measurement device 80 appears to the computer system 82 as a USB Mass Storage device, and alternative embodiments are contemplated. For example, in other embodiments the measurement device 80 may appear to the computer system 82 as another type of file storage device other than a USB Mass Storage Device. In one embodiment the computer system 82 may still be able to receive measurement data files from the measurement device 80 without using a device driver specific to the measurement device 80 or without requiring a device driver specific to the measurement device 80 to be installed. For example, the measurement device 80 may conform to file storage specifications other than USB Mass Storage specifications such that the computer system 82 is able to automatically detect connection of the measurement device 80 to the computer system 82 and configure itself to communicate with the measurement device 80, e.g., by using a standard file storage device driver provided by the operating system, similarly as described above.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for acquiring measurement data, the system comprising:

a computer system; and a measurement device coupled to the computer system;

wherein the computer system executes an operating system that includes functionality for automatically detecting and communicating with file storage devices;

wherein the measurement device implements file storage functionality in order to appear to the computer system as a file storage device;

wherein said measurement device appearing to the computer system as a file storage device enables the computer system to receive measurement data from the measurement device by using standard communication techniques for communicating with file storage devices and without installing a device driver specific to the measurement device.

2. The system of claim 1, wherein the measurement device implements USB Mass Storage functionality in order to appear to the computer system as a USB Mass Storage device;

wherein the computer system executes an operating system that includes functionality for detecting and communicating with USB Mass Storage devices;

wherein said measurement device appearing to the computer system as a USB Mass Storage device enables the computer system to receive measurement data from the measurement device by using standard communication techniques for communicating with USB Mass Storage devices and without installing a device driver specific to the measurement device.

3. The system of claim 2, wherein the measurement device is operable to:

generate measurement data based on a signal from a physical system; and construct a file based on the measurement data;

wherein the computer system is operable to receive the file from the measurement device using standard communication techniques for communicating with USB Mass Storage devices, wherein said computer system receiving the file from the measurement device does not require a device driver specific to the measurement device.

4. The system of claim 1, wherein the measurement device is operable to:

generate measurement data based on a signal from a physical system; and construct a file based on the measurement data;

wherein the computer system is operable to receive the file from the measurement device using standard communication techniques for communicating with file storage devices, wherein said computer system receiving the file from the measurement device does not require a device driver specific to the measurement device.

5. The system of claim 4, wherein the measurement device includes a memory;

wherein the measurement device is further operable to store the file in the memory;

wherein said computer system receiving the file from the measurement device comprises the computer system receiving the file from the memory.

6. The system of claim 5, wherein the memory is detachable from the measurement device;

wherein detaching the memory enables a user to replace the memory with another memory.

7. The system of claim 6, wherein the memory comprises a standard and commonly available memory component.

8. The system of claim 7, wherein the memory comprises one of:

a Compact Flash™ component;

a Memory Stick® component;

a Smart Media™ component;

a microdrive;

a USB flash memory key.

9. The system of claim 4, wherein said measurement device constructing the file based on the measurement data comprises the measurement device dynamically constructing the file in response to a request from the computer system, without storing the file in a memory of the measurement device.

10. The system of claim 4, wherein the computer system executes a measurement application program;

wherein said computer system receiving the file from the measurement device comprises the computer system receiving the file from the measurement device in response to a request generated by the measurement application program;

wherein the measurement application program is operable to obtain the measurement data from the file.

11. The system of claim 4, wherein said measurement device constructing the file based on the measurement data comprises the measurement device constructing one of:

a spreadsheet file that includes the measurement data;

an HTML file that includes the measurement data;

an XML file that includes the measurement data;

a human-readable text file that includes the measurement data;

a graph that visually indicates the measurement data;

an executable program file that utilizes the measurement data.

12. The system of claim 4, wherein said measurement device generating the measurement data from the physical system comprises generating live measurement data from the physical system;

wherein said measurement device constructing the file based on the measurement data comprises the measurement device constructing the file based on the live measurement data.

13. The system of claim 12, wherein the live measurement data comprises streaming data.

14. The system of claim 1, wherein the computer system is operable to store a file on the measurement device using standard communication techniques for communicating with file storage devices, wherein said storing the file on the measurement device does not require a device driver specific to the measurement device;

wherein the file includes configuration information for the measurement device;

wherein the measurement device is operable to configure itself based on the configuration information in the file.

15. The system of claim 1, wherein the computer system is operable to store a file on the measurement device using standard communication techniques for communicating with file storage devices, wherein said storing the file on the measurement device does not require a device driver specific to the measurement device;

wherein the file specifies commands for the measurement device;

wherein the measurement device is operable to read the commands from the file and perform the commands.

16. A method for acquiring measurement data, the method comprising:

connecting a measurement device to a USB bus of a computer system, wherein the computer system executes an operating system that includes functionality for detecting and communicating with USB Mass Storage devices, wherein the measurement device implements USB Mass Storage functionality in order to appear to the computer system as a USB Mass Storage device;

the measurement device generating measurement data based on a signal from a physical system;

the measurement device constructing a file based on the measurement data; and the computer system receiving the file from the measurement device using standard communication techniques for communicating with USB Mass Storage devices.

17. The method of claim 16, wherein said measurement device appearing to the computer system as a USB Mass Storage device enables the computer system to receive measurement data from the measurement device by using standard communication techniques for communicating with USB Mass Storage devices and without installing a device driver specific to the measurement device.

18. A system for acquiring measurement data, the system comprising:

a computer system; and a measurement device coupled to the computer system;

wherein the measurement device is operable to:

generate measurement data based on a signal from a physical system; and construct a file based on the measurement data;

wherein the computer system is operable to receive the file from the measurement device to obtain the measurement data.

19. The system of claim 18, wherein the measurement device includes a memory;

wherein the measurement device is further operable to store the file in the memory;

wherein said computer system receiving the file from the measurement device comprises the computer system receiving the file from the memory.

20. The system of claim 19, wherein the memory is detachable from the measurement device;

wherein detaching the memory enables a user to replace the memory with another memory.

21. The system of claim 20, wherein the memory comprises a standard and commonly available memory component.

22. The system of claim 18, wherein said measurement device constructing the file based on the measurement data comprises the measurement device dynamically constructing the file in response to a request from the computer system, without storing the file in a memory of the measurement device.

23. The system of claim 18, wherein the computer system executes a measurement application program;

wherein said computer system receiving the file from the measurement device comprises the computer system receiving the file from the measurement device in response to a request generated by the measurement application program;

wherein the measurement application program is operable to obtain the measurement data from the file.

24. The system of claim 18, wherein said measurement device constructing the file based on the measurement data comprises the measurement device constructing one of:

a spreadsheet file that includes the measurement data;

an HTML file that includes the measurement data;

an XML file that includes the measurement data;

a human-readable text file that includes the measurement data;

a graph that visually indicates the measurement data;

an executable program file that utilizes the measurement data.

25. The system of claim 18, wherein said measurement device generating the measurement data from the physical system comprises the measurement device generating live measurement data from the physical system;

wherein said measurement device constructing the file based on the measurement data comprises the measurement device constructing the file based on the live measurement data.

26. The system of claim 18, wherein the computer system is operable to store a file on the measurement device, wherein the file includes configuration information for the measurement device;

wherein the measurement device is operable to configure itself based on the configuration information in the file.

27. The system of claim 18, wherein the computer system is operable to store a file on the measurement device, wherein the file specifies commands for the measurement device;

wherein the measurement device is operable to read the commands from the file and perform the commands.

28. The system of claim 18, wherein the measurement device constructs the file in order to appear to the computer system as a file storage device;

wherein the computer system is operable to receive measurement data from the measurement device by using standard communication techniques for communicating with file storage devices and without installing a device driver specific to the measurement device.

29. A measurement device, comprising:

a measurement acquisition unit operable to couple to a physical system to receive signals and generate measurement data based on the received signals;

a memory coupled to the measurement acquisition unit, wherein the memory is operable to store a file comprising the measurement data;

wherein the measurement device implements file storage functionality in order to appear as a file storage device;

wherein the measurement device is operable to provide the file using standard communication techniques for file storage device communication.

30. The measurement device of claim 29, wherein the measurement device is operable to provide the file to a computer system in response to a request made by the computer system using standard communication techniques for communicating with file storage devices and without requiring the computer system to install a device driver specific to the measurement device.

31. The measurement device of claim 29, wherein the measurement device implements USB Mass Storage functionality in order to appear as a USB Mass Storage device.

32. A method for acquiring measurement data, the method comprising:

connecting a measurement device to a USB bus of a computer system, wherein the computer system executes an operating system that includes functionality for detecting and communicating with USB Mass Storage devices, wherein the measurement device implements USB Mass Storage functionality in order to appear to the computer system as a USB Mass Storage device;

the measurement device acquiring a signal from a physical system;

the measurement device generating measurement data based on the signal from the physical system;

the measurement device constructing a file based on the measurement data; and the measurement device providing the file to the computer system using standard communication techniques for USB Mass Storage device communication.

33. The method of claim 32, wherein the measurement device providing the file to the computer system is performed without requiring installation of a device driver specific to the measurement device on the computer system.

* * * * *

UNITED STATES PATENT AND TRADEMARK OFFICE

CERTIFICATE OF CORRECTION

PATENT NO. : 7,184,922 C1
APPLICATION NO. : 90/010524 and 90/011173
DATED : February 21, 2012
INVENTOR(S) : Ousley et al.

It is certified that error appears in the above-identified patent and that said Letters Patent is hereby corrected as shown below:

In the Claims:

Claim 129, Column 14, Line 35, please delete "The system of claim 113," and substitute -- The system of claim 115, --.

Signed and Sealed this
Twenty-ninth Day of May, 2012

David J. Kappos

David J. Kappos
*Director of the United States Patent and Trademark Office*

US007184922C1

(12) EX PARTE REEXAMINATION CERTIFICATE (8864th)
United States Patent
Ousley et al.

(10) Number: US 7,184,922 C1
(45) Certificate Issued: Feb. 21, 2012

(54) MEASUREMENT DEVICE THAT APPEARS TO A COMPUTER SYSTEM AS A FILE STORAGE DEVICE

(75) Inventors: Timothy H. Ousley, Austin, TX (US); Mike Muecke, Austin, TX (US); Robert Watzlavick, Austin, TX (US)

(73) Assignee: National Instruments Corporation, Austin, TX (US)

Reexamination Request:
No. 90/010,524, May 5, 2009
No. 90/011,173, Aug. 23, 2010

Reexamination Certificate for:

| | |
|---|---|
| Patent No.: | **7,184,922** |
| Issued: | **Feb. 27, 2007** |
| Appl. No.: | **11/068,547** |
| Filed: | **Feb. 28, 2005** |

Related U.S. Application Data

(60) Provisional application No. 60/605,205, filed on Aug. 27, 2004.

(51) Int. Cl.
*G01D 1/00* (2006.01)

(52) U.S. Cl. ........................ 702/127; 702/121; 702/122; 702/123; 702/188; 702/189; 702/57; 702/77; 710/72; 710/74; 710/8

(58) Field of Classification Search ........................ None
See application file for complete search history.

(56) References Cited

To view the complete listing of prior art documents cited during the proceedings for Reexamination Control Numbers 90/010,524 and 90/011,173, please refer to the USPTO's public Patent Application Information Retrieval (PAIR) system under the Display References tab.

*Primary Examiner*—Matthew Heneghan

(57) ABSTRACT

A measurement device operable to communicate with a computer system via files. The computer system may receive one or more files created by the measurement device, where the files include measurement data generated by the measurement device and may utilize the files to perform a measurement application. The measurement device may also be operable to receive a configuration file from the computer system and configure or control itself according to commands or settings therein. In one embodiment the measurement device may appear to the computer system as a USB Mass Storage device, and the files created by the measurement device may appear as files stored on a USB Mass Storage device. Thus, the computer system may communicate with the measurement device to obtain the measurement data files in the same standard manner in which it would obtain files stored on any other USB Mass Storage device.

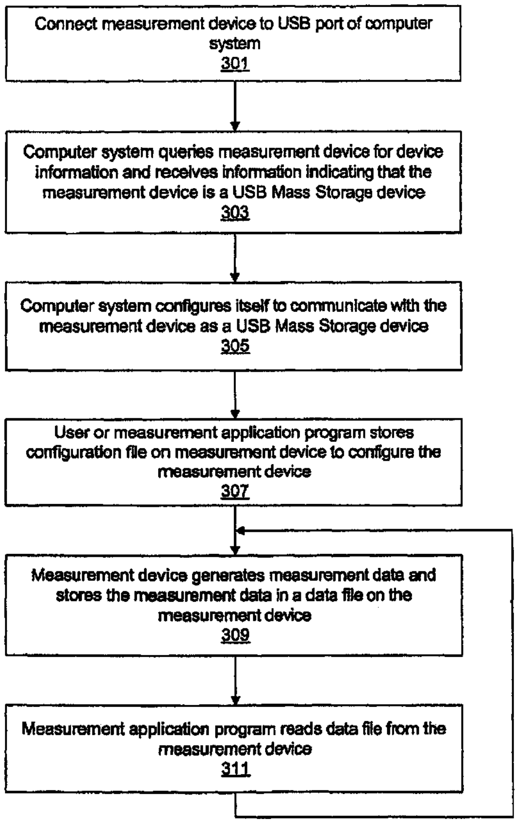

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 32 and 33 is confirmed.

Claims 4, 5, 16, 17 and 19 are cancelled.

Claims 1, 3, 6, 8-12, 18, 20, 22, 24 and 29 are determined to be patentable as amended.

Claims 2, 7, 13-15, 21, 23, 25-28 and 30-31, dependent on an amended claim, are determined to be patentable.

New claims 34-203 are added and determined to be patentable.

1. A system for acquiring measurement data, the system comprising:

a computer system; and a measurement device coupled to the computer system, *wherein the measurement device is configured for performing measurements, and wherein the measurement device includes a memory*;

wherein the computer system executes an operating system that includes functionality for automatically detecting and communicating with file storage devices;

wherein the measurement device implements file storage functionality in order to appear to the computer system as a file storage device;

wherein said measurement device appearing to the computer system as a file storage device enables the computer system to receive measurement data from the measurement device by using standard communication techniques for communicating with file storage devices and without installing a device driver specific to the measurement device*; and*

*wherein the measurement device is operable to:*

*generate measurement data based on a signal from a physical system; and*

*construct a file based on the measurement data;*

*store the file in the memory;*

*wherein the computer system is operable to receive the file from the measurement device using standard communication techniques for communicating with file storage devices, wherein said computer system receiving the file from the measurement device does not require a device driver specific to the measurement device, wherein the computer system is operable to communicate with the measurement device using a standard file storage device driver provided by or built in to the operating system of the computer system, and wherein said computer system receiving the file from the measurement device comprises the computer system receiving the file from the memory.*

3. The system of claim 2,

[wherein the measurement device is operable to:

generate measurement data based on a signal from a physical system; and construct a file based on the measurement data;]

wherein the computer system is operable to receive the file from the measurement device using standard communication techniques for communicating with USB Mass Storage devices, wherein said computer system receiving the file from the measurement device does not require a device driver specific to the measurement device.

6. The system of claim [5] *1*, wherein the memory is detachable from the measurement device;

wherein detaching the memory enables a user to replace the memory with another memory.

8. The system of claim 7, wherein the memory comprises one of:

a Compact Flash™ component;

a Memory Stick® component;

a Smart Media™ component;

a microdrive; *or* a USB flash memory key.

9. The system of claim [4] *1*, wherein said measurement device constructing the file based on the measurement data comprises the measurement device dynamically constructing the file in response to a request from the computer system[, without storing the file in a memory of the measurement device].

10. The system of claim [4] *1*, wherein the computer system executes a measurement application program;

wherein said computer system receiving the file from the measurement device *is performed in* response to a request generated by the measurement application program;

wherein the measurement application program is operable to obtain the measurement data from the file.

11. The system of claim [4] *1*, wherein said measurement device constructing the file based on the measurement data comprises the measurement device constructing one of:

a spreadsheet file that includes the measurement data;

an HTML file that includes the measurement data;

an XML file that includes the measurement data;

a human-readable text file that includes the measurement data;

a graph that visually indicates the measurement data; *or* an executable program file that utilizes the measurement data.

12. The system of claim [4] *1*, wherein said measurement device generating the measurement data from the physical system comprises generating live measurement data from the physical system;

wherein said measurement device constructing the file based on the measurement data comprises the measurement device constructing the file based on the live measurement data.

18. A system for acquiring measurement data, the system comprising:

a computer system; and a measurement device coupled to the computer system, *wherein the measurement device includes a memory*;

wherein the measurement device is operable to:

generate measurement data based on a signal from a physical system; and construct a file based on the measurement data;

*store the file in the memory;* wherein the computer system is operable to receive the file from the measurement device to obtain the measurement data, *wherein said computer system receiving the file from the measurement device comprises the computer system receiving the file from the memory, and wherein the computer system is operable to communicate with the measurement device using a standard file storage device driver provided by or built in to an operating system of the computer system.*

20. The system of claim [19] *18*, wherein the memory is detachable from the measurement device;

wherein detaching the memory enables a user to replace the memory with another memory.

22. The system of claim 18, wherein said measurement device constructing the file based on the measurement data comprises the measurement device dynamically constructing the file in response to a request from the computer system[, without storing the file in a memory of the measurement device].

24. The system of claim 18, wherein said measurement device constructing the file based on the measurement data comprises the measurement device constructing one of:

a spreadsheet file that includes the measurement data;

an HTML file that includes the measurement data;

an XML file that includes the measurement data;

a human-readable text file that includes the measurement data;

a graph that visually indicates the measurement data; *or* an executable program file that utilizes the measurement data.

29. A measurement device, comprising:

a measurement acquisition unit operable to couple to a physical system to receive signals and generate measurement data based on the received signals;

a memory coupled to the measurement acquisition unit, wherein the memory is operable to store a file comprising the measurement data;

wherein the measurement device implements file storage functionality in order to appear as a file storage device;

wherein the measurement device is operable to provide the file using standard communication techniques for file storage device communication*;*

*wherein the measurement device is operable to communicate with a computer system via a standard file storage device driver provided by or built in to an operating system of the computer system.*

*34. The system of claim 1, wherein the computer system uses mass storage communication techniques for communicating with the measurement device.*

*35. The system of claim 1, wherein the computer system is configured to display the measurement data on a display.*

*36. The system of claim 1, wherein the computer system and the measurement device are coupled over a network.*

*37. The system of claim 1, wherein the measurement device is configured to continuously generate the measurement data.*

*38. The system of claim 1, wherein the measurement device is configured to generate a plurality of files representing the measurement data.*

*39. The system of claim 1, wherein the measurement device is configured to periodically remove and re-attach itself to the computer system.*

*40. The system of claim 1, wherein the computer system is operable to automatically detect connection of the measurement device to the computer system and configure itself to communicate with the measurement device.*

*41. The system of claim 18, wherein the computer system uses mass storage communication techniques for communicating with the measurement device.*

*42. The system of claim 18, wherein the computer system is configured to display the measurement data on a display.*

*43. The system of claim 18, wherein the computer system and the measurement device are coupled over a network.*

*44. The system of claim 18, wherein the measurement device is configured to continuously generate the measurement data.*

*45. The system of claim 18, wherein the measurement device is configured to generate one or more additional files based on the measurement data.*

*46. The system of claim 18, wherein the measurement device is configured to periodically remove and re-attach itself to the computer system.*

*47. The system of claim 18, wherein the computer system is operable to automatically detect connection of the measurement device to the computer system and configure itself to communicate with the measurement device.*

*48. The measurement device of claim 29, wherein the memory is detachable from the measurement device, wherein detaching the memory enables a user to replace the memory with another memory.*

*49. The measurement device of claim 29, wherein the memory comprises a standard and commonly available memory component.*

*50. The measurement device of claim 29, wherein the memory comprises one of:*

*a Compact Flash™ component;*

*a Memory Stick® component;*

*a Smart Media™ component;*

*a microdrive; or*

*a USB flash memory key.*

*51. The measurement device of claim 29, wherein the file comprises one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*52. The measurement device of claim 29, wherein the measurement device is configured to receive a first file, wherein the first file includes configuration information for the measurement device, wherein the measurement device is configured to configure itself based on the configuration information in the first file.*

*53. The measurement device of claim 29, wherein the measurement device is configured to receive a first file, wherein the first file specifies commands for the measurement device, wherein the measurement device is configured to read and perform the commands from the first file.*

*54. The measurement device of claim 29, wherein the measurement device is configured to provide the file using mass storage communication techniques for file storage device communication.*

*55. The measurement device of claim 29, wherein the measurement device is configured to continuously generate the measurement data.*

*56. The measurement device of claim 29, wherein the measurement device is configured to generate one or more additional files comprising the measurement data.*

*57. The measurement of device of claim 29, wherein the measurement device is configured to periodically remove and re-attach itself to a computer system.*

*58. The method of claim 32, wherein the measurement device includes a memory, wherein the file is stored in the memory, and wherein the measurement device providing the file comprises the measurement device providing the file from the memory.*

*59. The method of claim 58, further comprising:*

*detaching the memory from the measurement device, wherein detaching the memory enables a user to replace the memory with another memory.*

*60. The method of claim 58, wherein the memory comprises a standard and commonly available memory component.*

*61. The method of claim 58, wherein the memory comprises one of:*

*a Compact Flash™ component;*

*a Memory Stick® component;*

*a Smart Media™ component;*

*a microdrive; or*

*a USB flash memory key.*

*62. The method of claim 32, wherein said measurement device constructing the file based on the measurement data comprises the measurement device dynamically constructing the file in response to a request from the computer system.*

*63. The method of claim 32, wherein the computer system executes a measurement application program, wherein the measurement device providing the file is performed in response to a request generated by the measurement application program, wherein the measurement application program is configured to obtain the measurement data from the file.*

*64. The method of claim 32, wherein said measurement device constructing the file based on the measurement data comprises the measurement device constructing one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*65. The method of claim 32, wherein the measurement device generating the measurement data comprises generating live measurement data from the physical system, wherein the measurement device constructing the file based on the measurement data comprises the measurement device constructing the file based on the live measurement data.*

*66. The method of claim 65, wherein the live measurement data comprises streaming data.*

*67. The method of claim 32, further comprising:*

*the measurement device receiving a first file from the computer system, wherein the first file includes configuration information for the measurement device; and*

*the measurement device configuring itself based on the configuration information in the first file.*

*68. The method of claim 32, further comprising:*

*the measurement device receiving a first file from the computer system, wherein the first file specifies commands for the measurement device; and*

*the measurement device reading and performing the commands from the first file.*

*69. The method of claim 32, further comprising:*

*the measurement device continuously generating the measurement data.*

*70. The method of claim 32, further comprising:*

*the measurement device constructing one or more additional files based on the measurement data; and*

*the measurement device providing the one or more additional files to the computer system.*

*71. The method of claim 32, further comprising:*

*the measurement device periodically removing and re-attaching itself to the computer system.*

*72. A system for acquiring measurement data, the system comprising:*

*a computer system; and*

*a measurement device coupled to the computer system, wherein the measurement device includes a memory;*

*wherein the computer system executes an operating system that includes functionality for automatically detecting and communicating with file storage devices;*

*wherein the measurement device implements file storage functionality in order to appear to the computer system as a file storage device;*

*wherein said measurement device appearing to the computer system as a file storage device enables the computer system to receive measurement data from the measurement device by using standard communication techniques for communicating with file storage devices and without installing a device driver specific to the measurement device;*

*wherein the measurement device is configured to periodically remove and re-attach itself to the computer system;*

*wherein the measurement device is operable to:*

*generate measurement data based on a signal from a physical system; and*

*construct a file based on the measurement data;*

*store the file in the memory;*

*wherein the computer system is operable to receive the file from the measurement device using standard communication techniques for communicating with file storage devices, wherein said computer system receiving the file from the measurement device does not require a device driver specific to the measurement device, and wherein said computer system receiving the file from the measurement device comprises the computer system receiving the file from the memory.*

*73. The system of claim 72,*

*wherein the memory is detachable from the measurement device;*

*wherein detaching the memory enables a user to replace the memory with another memory.*

*74. The system of claim 73,*

*wherein the memory comprises a standard and commonly available memory component.*

*75. The system of claim 74, wherein the memory comprises one of:*

*a Compact Flash™ component;*

*a Memory Stick® component;*

*a Smart Media™ component;*

*a microdrive; or*

*a USB flash memory key.*

*76. A system for acquiring measurement data, the system comprising:*

*a computer system; and*

*a measurement device coupled to the computer system, wherein the measurement device includes a memory;*

*wherein the measurement device is operable to:*

*generate measurement data based on a signal from a physical system; and*

*construct a file based on the measurement data;*

*store the file in the memory;*

*wherein the measurement device is configured to periodically remove and re-attach itself to the computer system;*

*wherein the computer system is operable to receive the file from the measurement device to obtain the measurement data, wherein said computer system receiving the file from the measurement device comprises the computer system receiving the file from the memory.*

*77. The system of claim 76,*

*wherein the memory is detachable from the measurement device;*

*wherein detaching the memory enables a user to replace the memory with another memory.*

*78. The system of claim 77,*

*wherein the memory comprises a standard and commonly available memory component.*

*79. A system for acquiring measurement data, the system comprising:*

*a computer system; and*

*a measurement device coupled to the computer system, wherein the computer system and the measurement device are coupled over a network;*

*wherein the computer system executes an operating system that includes functionality for automatically detecting and communicating with file storage devices;*

*wherein the measurement device implements file storage functionality in order to appear to the computer system as a file storage device;*

*wherein the computer system is operable to communicate with the measurement device using a standard file storage device driver provided by or built in to the operating system of the computer system;*

*wherein said measurement device appearing to the computer system as a file storage device enables the computer system to receive measurement data from the measurement device by using standard communication techniques for communicating with file storage devices and without installing a device driver specific to the measurement device.*

*80. A system for acquiring measurement data, the system comprising:*

*a computer system; and*

*a measurement device coupled to the computer system;*

*wherein the computer system executes an operating system that includes functionality for automatically detecting and communicating with file storage devices;*

*wherein the measurement device implements file storage functionality in order to appear to the computer system as a file storage device and wherein the measurement device is configured to generate a plurality of files representing measurement data;*

*wherein the computer system is operable to communicate with the measurement device using a standard file storage device driver provided by or built in to the operating system of the computer system;*

*wherein said measurement device appearing to the computer system as a file storage device enables the computer system to receive the measurement data from the measurement device by using standard communication techniques for communicating with file storage devices and without installing a device driver specific to the measurement device.*

*81. A system for acquiring measurement data, the system comprising:*

*a computer system; and*

*a measurement device coupled to the computer system;*

*wherein the computer system executes an operating system that includes functionality for automatically detecting and communicating with file storage devices;*

*wherein the measurement device implements file storage functionality in order to appear to the computer system as a file storage device and wherein the measurement device is configured to periodically remove and re-attach itself to the computer system;*

*wherein said measurement device appearing to the computer system as a file storage device enables the computer system to receive measurement data from the measurement device by using standard communication techniques for communicating with file storage devices and without installing a device driver specific to the measurement device.*

*82. A system for acquiring measurement data, the system comprising:*

*a computer system; and*

*a measurement device coupled to the computer system;*

*wherein the measurement device is operable to:*

*generate measurement data based on a signal from a physical system; and*

*construct a file based on the measurement data;*

*wherein the computer system is operable to receive the file from the measurement device to obtain the measurement data and wherein the computer system uses USB mass storage communication techniques for communicating with the measurement device.*

*83. A system for acquiring measurement data, the system comprising:*

*a computer system; and*

*a measurement device coupled to the computer system over a network;*

*wherein the measurement device is operable to:*

*generate measurement data based on a signal from a physical system; and*

*construct a file based on the measurement data;*

*wherein the computer system is operable to receive the file from the measurement device to obtain the measurement data;*

*wherein the computer system is operable to communicate with the measurement device using a standard file storage device driver provided by or built in to an operating system of the computer system.*

*84. A system for acquiring measurement data, the system comprising:*

*a computer system; and*

*a measurement device coupled to the computer system;*

*wherein the measurement device is operable to:*

*generate measurement data based on a signal from a physical system;*

*construct a file based on the measurement data; and*

*generate one or more additional files based on the measurement data;*

*wherein the computer system is operable to receive the file from the measurement device to obtain the measurement data;*

*wherein the computer system is operable to communicate with the measurement device using a standard file storage device driver provided by or built in to an operating system of the computer system.*

*85. A system for acquiring measurement data, the system comprising:*

*a computer system; and*

*a measurement device coupled to the computer system;*

*wherein the measurement device is operable to:*

*generate measurement data based on a signal from a physical system; and*

*construct a file based on the measurement data; and*

*periodically remove and re-attach itself to the computer system;*

*wherein the computer system is operable to receive the file from the measurement device to obtain the measurement data.*

*86. A system for acquiring measurement data, the system comprising:*

*a computer system; and*

*a measurement device coupled to the computer system, wherein the measurement device includes a memory, and wherein the measurement device implements USB Mass Storage functionality in order to appear as a USB Mass Storage device;*

*wherein the measurement device is operable to:*

*generate measurement data based on a signal from a physical system; and*

*construct a file based on the measurement data;*

*store the file in the memory;*

*wherein the computer system is operable to receive the file from the measurement device to obtain the measurement data, wherein said computer system receiving the file from the measurement device comprises the computer system receiving the file from the memory.*

*87. The system of claim 86,*

*wherein the memory is detachable from the measurement device;*

*wherein detaching the memory enables a user to replace the memory with another memory.*

*88. The system of claim 87,*

*wherein the memory comprises a standard and commonly available memory component.*

*89. The system of claim 86,*

*wherein said measurement device constructing the file based on the measurement data comprises the measurement device dynamically constructing the file in response to a request from the computer system.*

*90. The system of claim 86,*

*wherein the computer system executes a measurement application program;*

*wherein said computer system receiving the file from the measurement device comprises the computer system receiving the file from the measurement device in response to a request generated by the measurement application program;*

*wherein the measurement application program is operable to obtain the measurement data from the file.*

*91. The system of claim 86,*

*wherein said measurement device constructing the file based on the measurement data comprises the measurement device constructing one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*92. The system of claim 86,*

*wherein said measurement device generating the measurement data from the physical system comprises the measurement device generating live measurement data from the physical system;*

*wherein said measurement device constructing the file based on the measurement data comprises the measurement device constructing the file based on the live measurement data.*

*93. The system of claim 86,*

*wherein the computer system is operable to store a file on the measurement device, wherein the file includes configuration information for the measurement device;*

*wherein the measurement device is operable to configure itself based on the configuration information in the file.*

*94. The system of claim 86,*

*wherein the computer system is operable to store a file on the measurement device, wherein the file specifies commands for the measurement device;*

*wherein the measurement device is operable to read the commands from the file and perform the commands.*

*95. The system of claim 86,*

*wherein the measurement device constructs the file in order to appear to the computer system as a file storage device;*

*wherein the computer system is operable to receive measurement data from the measurement device by using standard communication techniques for communicating with file storage devices and without installing a device driver specific to the measurement device.*

*96. The system of claim 86, wherein the computer system uses mass storage communication techniques for communicating with the measurement device.*

*97. The system of claim 86, wherein the computer system is configured to display the measurement data on a display.*

*98. The system of claim 86, wherein the computer system and the measurement device are coupled over a network.*

*99. The system of claim 86, wherein the measurement device is configured to continuously generate the measurement data.*

*100. The system of claim 86, wherein the measurement device is configured to generate one or more additional files based on the measurement data.*

*101. The system of claim 86, wherein the measurement device is configured to periodically remove and re-attach itself to the computer system.*

*102. The system of claim 86, wherein the measurement device is further operable to couple to the physical system to receive signals, wherein the measurement device implements file storage functionality in order to appear as a file storage device, and wherein the measurement device is operable to provide the file using standard communication techniques for file storage device communication.*

*103. A measurement device, comprising:*

*a measurement acquisition unit operable to couple to a physical system to receive signals and generate measurement data based on the received signals;*

*a memory coupled to the measurement acquisition unit, wherein the memory is operable to store a file comprising the measurement data;*

*wherein the measurement device implements file storage functionality in order to appear as a file storage device;*

*wherein the measurement device is operable to provide the file using standard communication techniques for file storage device communication;*

*wherein the measurement device implements USB Mass Storage functionality in order to appear as a USB Mass Storage device.*

*104. The measurement device of claim 103,*

*wherein the measurement device is operable to provide the file to a computer system in response to a request made by the computer system using standard communication techniques for communicating with file storage devices and without requiring the computer system to install a device driver specific to the measurement device.*

*105. The measurement device of claim 103, wherein the memory is detachable from the measurement device, wherein detaching the memory enables a user to replace the memory with another memory.*

*106. The measurement device of claim 103, wherein the memory comprises a standard and commonly available memory component.*

*107. The measurement device of claim 103, wherein the memory comprises one of:*

*a Compact Flash™ component;*

*a Memory Stick® component;*

*a Smart Media™ component;*

*a microdrive; or*

*a USB flash memory key.*

*108. The measurement device of claim 103, wherein the file comprises one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*109. The measurement device of claim 103, wherein the measurement device is configured to receive a first file, wherein the first file includes configuration information for the measurement device, wherein the measurement device is configured to configure itself based on the configuration information in the first file.*

*110. The measurement device of claim 103, wherein the measurement device is configured to receive a first file, wherein the first file specifies commands for the measurement device, wherein the measurement device is configured to read and perform the commands from the first file.*

*111. The measurement device of claim 103, wherein the measurement device is configured to provide the file using mass storage communication techniques for file storage device communication.*

*112. The measurement device of claim 103, wherein the measurement device is configured to continuously generate the measurement data.*

*113. The measurement device of claim 103, wherein the measurement device is configured to generate one or more additional files comprising the measurement data.*

*114. The measurement device of claim 103, wherein the measurement device is configured to periodically remove and re-attach itself to a computer system.*

*115. A system for acquiring measurement data, the system comprising:*

*a computer system; and*

*a measurement device coupled to the computer system, wherein the measurement device is configured for performing measurements, and wherein the measurement device includes a memory;*

*wherein the computer system executes an operating system that includes functionality for automatically detecting and communicating with file storage devices;*

*wherein the measurement device implements file storage functionality in order to appear to the computer system as a file storage device;*

*wherein said measurement device appearing to the computer system as a file storage device enables the computer system to receive measurement data from the measurement device by using standard communication techniques for communicating with file storage devices and without installing a device driver specific to the measurement device; and*

*wherein the measurement device is operable to:*

*generate measurement data based on a signal from a physical system; and*

*construct a file based on the measurement data;*

*store the file in the memory;*

*wherein the computer system is operable to receive the file from the measurement device using standard communication techniques for communicating with file storage devices, wherein said computer system receiving the file from the measurement device does not require a device driver specific to the measurement device, and wherein said computer system receiving the file from the measurement device comprises the computer system receiving the file from the memory;*

*wherein the measurement device implements USB Mass Storage functionality in order to appear to the computer system as a USB Mass Storage device;*

*wherein the computer system executes an operating system that includes functionality for detecting and communicating with USB Mass Storage devices;*

*wherein said measurement device appearing to the computer system as a USB Mass Storage device enables the*

*computer system to receive measurement data from the measurement device by using standard communication techniques for communicating with USB Mass Storage devices and without installing a device driver specific to the measurement device.*

*116. The system of claim 115,*

*wherein the computer system is operable to receive the file from the measurement device using standard communication techniques for communicating with USB Mass Storage devices, wherein said computer system receiving the file from the measurement device does not require a device driver specific to the measurement device.*

*117. The system of claim 115,*

*wherein the memory is detachable from the measurement device;*

*wherein detaching the memory enables a user to replace the memory with another memory.*

*118. The system of claim 117,*

*wherein the memory comprises a standard and commonly available memory component.*

*119. The system of claim 118, wherein the memory comprises one of:*

*a Compact Flash™ component;*

*a Memory Stick® component;*

*a Smart Media™ component;*

*a microdrive; or*

*a USB flash memory key.*

*120. The system of claim 115,*

*wherein said measurement device constructing the file based on the measurement data comprises the measurement device dynamically constructing the file in response to a request from the computer system.*

*121. The system of claim 115,*

*wherein the computer system executes a measurement application program;*

*wherein said computer system receiving the file from the measurement device is performed in response to a request generated by the measurement application program;*

*wherein the measurement application program is operable to obtain the measurement data from the file.*

*122. The system of claim 115,*

*wherein said measurement device constructing the file based on the measurement data comprises the measurement device constructing one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*123. The system of claim 115,*

*wherein said measurement device generating the measurement data from the physical system comprises generating live measurement data from the physical system;*

*wherein said measurement device constructing the file based on the measurement data comprises the measurement device constructing the file based on the live measurement data.*

*124. The system of claim 123,*

*wherein the live measurement data comprises streaming data.*

*125. The system of claim 115,*

*wherein the computer system is operable to store a file on the measurement device using standard communication techniques for communicating with file storage devices, wherein said storing the file on the measurement device does not require a device driver specific to the measurement device;*

*wherein the file includes configuration information for the measurement device;*

*wherein the measurement device is operable to configure itself based on the configuration information in the file.*

*126. The system of claim 115,*

*wherein the computer system is operable to store a file on the measurement device using standard communication techniques for communicating with file storage devices, wherein said storing the file on the measurement device does not require a device driver specific to the measurement device;*

*wherein the file specifies commands for the measurement device;*

*wherein the measurement device is operable to read the commands from the file and perform the commands.*

*127. The system of claim 115, wherein the computer system uses mass storage communication techniques for communicating with the measurement device.*

*128. The system of claim 115, wherein the computer system is configured to display the measurement data on a display.*

*129. The system of claim 113, wherein the computer system and the measurement device are coupled over a network.*

*130. The system of claim 115, wherein the measurement device is configured to continuously generate the measurement data.*

*131. The system of claim 115, wherein the measurement device is configured to generate a plurality of files representing the measurement data.*

*132. The system of claim 115, wherein the measurement device is configured to periodically remove and re-attach itself to the computer system.*

*133. A system for acquiring measurement data, the system comprising:*

*a computer system; and*

*a measurement device coupled to the computer system via a USB interface, wherein the measurement device includes a memory;*

*wherein the measurement device is operable to:*

*generate measurement data based on a signal from a physical system; and*

*construct a file based on the measurement data;*

*store the file in the memory;*

*wherein the computer system is operable to receive the file from the measurement device to obtain the measurement data, wherein said computer system receiving the file from the measurement device comprises the computer system receiving the file from the memory via the USB interface.*

*134. The system of claim 133, wherein the computer system is further operable to communicate with the measurement device using a USB device driver.*

*135. The system of claim 133,*

*wherein the memory is detachable from the measurement device;*

*wherein detaching the memory enables a user to replace the memory with another memory.*

*136. The system of claim 135,*

*wherein the memory comprises a standard and commonly available memory component.*

*137. The system of claim 133,*

*wherein said measurement device constructing the file based on the measurement data comprises the measurement device dynamically constructing the file in response to a request from the computer system.*

*138. The system of claim 133,*

*wherein the computer system executes a measurement application program;*

*wherein said computer system receiving the file from the measurement device comprises the computer system receiving the file from the measurement device in response to a request generated by the measurement application program;*

*wherein the measurement application program is operable to obtain the measurement data from the file.*

*139. The system of claim 133,*

*wherein said measurement device constructing the file based on the measurement data comprises the measurement device constructing one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*140. The system of claim 133,*

*wherein said measurement device generating the measurement data from the physical system comprises the measurement device generating live measurement data from the physical system;*

*wherein said measurement device constructing the file based on the measurement data comprises the measurement device constructing the file based on the live measurement data.*

*141. The system of claim 133,*

*wherein the computer system is operable to store a file on the measurement device, wherein the file includes configuration information for the measurement device;*

*wherein the measurement device is operable to configure itself based on the configuration information in the file.*

*142. The system of claim 133,*

*wherein the computer system is operable to store a file on the measurement device, wherein the file specifies commands for the measurement device;*

*wherein the measurement device is operable to read the commands from the file and perform the commands.*

*143. The system of claim 133,*

*wherein the measurement device constructs the file in order to appear to the computer system as a file storage device;*

*wherein the computer system is operable to receive measurement data from the measurement device by using standard communication techniques for communicating with file storage devices and without installing a device driver specific to the measurement device.*

*144. A measurement device, comprising:*

*a measurement acquisition unit operable to couple to a physical system to receive signals and generate measurement data based on the received signals;*

*a memory coupled to the measurement acquisition unit, wherein the memory is operable to store a file comprising the measurement data;*

*wherein the measurement device implements file storage functionality in order to appear as a file storage device;*

*wherein the measurement device is operable to couple to another device via a USB interface;*

*wherein the measurement device is operable to provide the file via the USB interface using standard communication techniques for file storage device communication.*

*145. The system of claim 144, wherein the measurement device is operable to communicate via a USB device driver.*

*146. The measurement device of claim 144,*

*wherein the measurement device is operable to provide the file to a computer system in response to a request made by the computer system using standard communication techniques for communicating with file storage devices and without requiring the computer system to install a device driver specific to the measurement device.*

*147. The measurement device of claim 144,*

*wherein the measurement device implements USB Mass Storage functionality in order to appear as a USB Mass Storage device.*

*148. The measurement device of claim 144, wherein the memory is detachable from the measurement device, wherein detaching the memory enables a user to replace the memory with another memory.*

*149. The measurement device of claim 144, wherein the memory comprises a standard and commonly available memory component.*

*150. The measurement device of claim 144, wherein the memory comprises one of:*

*a Compact Flash™ component;*

*a Memory Stick® component;*

*a Smart Media™ component;*

*a microdrive; or*

*a USB flash memory key.*

*151. The measurement device of claim 144, wherein the file comprises one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*152. The measurement device of claim 144, wherein the measurement device is configured to receive a first file, wherein the first file includes configuration information for the measurement device, wherein the measurement device is configured to configure itself based on the configuration information in the first file.*

*153. The measurement device of claim 144, wherein the measurement device is configured to receive a first file, wherein the first file specifies commands for the measure-*

*ment device, wherein the measurement device is configured to read and perform the commands from the first file.*

*154. The measurement device of claim 144, wherein the measurement device is configured to provide the file using mass storage communication techniques for file storage device communication.*

*155. The measurement device of claim 144, wherein the measurement device is configured to continuously generate the measurement data.*

*156. The measurement device of claim 144, wherein the measurement device is configured to generate one or more additional files comprising the measurement data.*

*157. The measurement device of claim 144, wherein the measurement device is configured to periodically remove and re-attach itself to a computer system.*

*158. A system for acquiring measurement data, the system comprising:*

*a computer system; and*

*a measurement device coupled to the computer system, wherein the measurement device includes a memory;*

*wherein the measurement device is operable to:*

*generate measurement data based on a signal from a physical system; and*

*construct a file based on the measurement data;*

*store the file in the memory;*

*wherein the computer system is operable to receive the file from the measurement device to obtain the measurement data, wherein said computer system receiving the file from the measurement device comprises the computer system receiving the file from the memory and wherein the computer system is operable to communicate with the measurement device using a standard file storage device driver.*

*159. The system of claim 158,*

*wherein the memory is detachable from the measurement device;*

*wherein detaching the memory enables a user to replace the memory with another memory.*

*160. The system of claim 159,*

*wherein the memory comprises a standard and commonly available memory component.*

*161. The system of claim 158,*

*wherein said measurement device constructing the file based on the measurement data comprises the measurement device dynamically constructing the file in response to a request from the computer system.*

*162. The system of claim 158,*

*wherein the computer system executes a measurement application program;*

*wherein said computer system receiving the file from the measurement device comprises the computer system receiving the file from the measurement device in response to a request generated by the measurement application program;*

*wherein the measurement application program is operable to obtain the measurement data from the file.*

*163. The system of claim 158,*

*wherein said measurement device constructing the file based on the measurement data comprises the measurement device constructing one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*164. The system of claim 158,*

*wherein said measurement device generating the measurement data from the physical system comprises the measurement device generating live measurement data from the physical system;*

*wherein said measurement device constructing the file based on the measurement data comprises the measurement device constructing the file based on the live measurement data.*

*165. The system of claim 158,*

*wherein the computer system is operable to store a file on the measurement device, wherein the file includes configuration information for the measurement device;*

*wherein the measurement device is operable to configure itself based on the configuration information in the file.*

*166. The system of claim 158,*

*wherein the computer system is operable to store a file on the measurement device, wherein the file specifies commands for the measurement device;*

*wherein the measurement device is operable to read the commands from the file and perform the commands.*

*167. The system of claim 158,*

*wherein the measurement device constructs the file in order to appear to the computer system as a file storage device;*

*wherein the computer system is operable to receive measurement data from the measurement device by using standard communication techniques for communicating with file storage devices and without installing a device driver specific to the measurement device.*

*168. The system of claim 158, wherein the computer system uses mass storage communication techniques for communicating with the measurement device.*

*169. The system of claim 158, wherein the computer system is configured to display the measurement data on a display.*

*170. The system of claim 158, wherein the computer system and the measurement device are coupled over a network.*

*171. The system of claim 158, wherein the measurement device is configured to continuously generate the measurement data.*

*172. The system of claim 158, wherein the measurement device is configured to generate one or more additional files based on the measurement data.*

*173. The system of claim 158, wherein the measurement device is configured to periodically remove and re-attach itself to the computer system.*

*174. A measurement device, comprising:*

*a measurement acquisition unit operable to couple to a physical system to receive signals and generate measurement data based on the received signals;*

*a memory coupled to the measurement acquisition unit, wherein the memory is operable to store a file comprising the measurement data;*

*wherein the measurement device implements file storage functionality in order to appear as a file storage device;*

*wherein the measurement device is operable to provide the file using standard communication techniques for file storage device communication;*

*wherein the measurement device is operable to communicate with a computer system via a standard file storage device driver.*

*175. The measurement device of claim 174,*

*wherein the measurement device is operable to provide the file to a computer system in response to a request made by the computer system using standard communication techniques for communicating with file storage devices and without requiring the computer system to install a device driver specific to the measurement device.*

*176. The measurement device of claim 174, wherein the memory is detachable from the measurement device, wherein detaching the memory enables a user to replace the memory with another memory.*

*177. The measurement device of claim 174, wherein the memory comprises a standard and commonly available memory component.*

*178. The measurement device of claim 174, wherein the memory comprises one of:*

*a Compact Flash™ component;*

*a Memory Stick® component;*

*a Smart Media™ component;*

*a microdrive; or*

*a USB flash memory key.*

*179. The measurement device of claim 174, wherein the file comprises one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*180. The measurement device of claim 174, wherein the measurement device is configured to receive a first file, wherein the first file includes configuration information for the measurement device, wherein the measurement device is configured to configure itself based on the configuration information in the first file.*

*181. The measurement device of claim 174, wherein the measurement device is configured to receive a first file, wherein the first file specifies commands for the measurement device, wherein the measurement device is configured to read and perform the commands from the first file.*

*182. The measurement device of claim 174, wherein the measurement device is configured to provide the file using mass storage communication techniques for file storage device communication.*

*183. The measurement device of claim 174, wherein the measurement device is configured to continuously generate the measurement data.*

*184. The measurement device of claim 174, wherein the measurement device is configured to generate one or more additional files comprising the measurement data.*

*185. The measurement device of claim 174, wherein the measurement device is configured to periodically remove and re-attach itself to a computer system.*

*186. A system for acquiring measurement data, the system comprising:*

*a computer system; and*

*a measurement device coupled to the computer system, wherein the measurement device is configured for performing measurements, and wherein the measurement device includes a memory;*

*wherein the computer system executes an operating system that includes functionality for automatically detecting and communicating with file storage devices;*

*wherein the measurement device implements file storage functionality in order to appear to the computer system as a file storage device;*

*wherein said measurement device appearing to the computer system as a file storage device enables the computer system to receive measurement data from the measurement device by using standard communication techniques for communicating with file storage devices and without installing a device driver specific to the measurement device; and*

*wherein the measurement device is operable to:*

*generate measurement data based on a signal from a physical system; and*

*construct a file based on the measurement data;*

*store the file in the memory;*

*wherein the computer system is operable to receive the file from the measurement device using standard communication techniques for communicating with file storage devices, wherein said computer system receiving the file from the measurement device does not require a device driver specific to the measurement device, wherein the computer system is operable to communicate with the measurement device using a standard file storage device driver, and wherein said computer system receiving the file from the measurement device comprises the computer system receiving the file from the memory.*

*187. The system of claim 186,*

*wherein the computer system is operable to receive the file from the measurement device using standard communication techniques for communicating with USB Mass Storage devices, wherein said computer system receiving the file from the measurement device does not require a device driver specific to the measurement device.*

*188. The system of claim 186,*

*wherein the memory is detachable from the measurement device;*

*wherein detaching the memory enables a user to replace the memory with another memory.*

*189. The system of claim 188,*

*wherein the memory comprises a standard and commonly available memory component.*

*190. The system of claim 189, wherein the memory comprises one of:*

*a Compact Flash™ component;*

*a Memory Stick® component;*

*a Smart Media™ component;*

*a microdrive; or*

*a USB flash memory key.*

*191. The system of claim 186,*

*wherein said measurement device constructing the file based on the measurement data comprises the measurement device dynamically constructing the file in response to a request from the computer system.*

*192. The system of claim 186,*

*wherein the computer system executes a measurement application program;*

*wherein said computer system receiving the file from the measurement device is performed in response to a request generated by the measurement application program;*

*wherein the measurement application program is operable to obtain the measurement data from the file.*

*193. The system of claim 186,*

*wherein said measurement device constructing the file based on the measurement data comprises the measurement device constructing one of:*

*a spreadsheet file that includes the measurement data;*

*an HTML file that includes the measurement data;*

*an XML file that includes the measurement data;*

*a human-readable text file that includes the measurement data;*

*a graph that visually indicates the measurement data; or*

*an executable program file that utilizes the measurement data.*

*194. The system of claim 186,*

*wherein said measurement device generating the measurement data from the physical system comprises generating live measurement data from the physical system;*

*wherein said measurement device constructing the file based on the measurement data comprises the measurement device constructing the file based on the live measurement data.*

*195. The system of claim 194,*

*wherein the live measurement data comprises streaming data.*

*196. The system of claim 186,*

*wherein the computer system is operable to store a file on the measurement device using standard communication techniques for communicating with file storage devices, wherein said storing the file on the measurement device does not require a device driver specific to the measurement device;*

*wherein the file includes configuration information for the measurement device;*

*wherein the measurement device is operable to configure itself based on the configuration information in the file.*

*197. The system of claim 186,*

*wherein the computer system is operable to store a file on the measurement device using standard communication techniques for communicating with file storage devices, wherein said storing the file on the measurement device does not require a device driver specific to the measurement device;*

*wherein the file specifies commands for the measurement device;*

*wherein the measurement device is operable to read the commands from the file and perform the commands.*

*198. The system of claim 186, wherein the computer system uses mass storage communication techniques for communicating with the measurement device.*

*199. The system of claim 186, wherein the computer system is configured to display the measurement data on a display.*

*200. The system of claim 186, wherein the computer system and the measurement device are coupled over a network.*

*201. The system of claim 186, wherein the measurement device is configured to continuously generate the measurement data.*

*202. The system of claim 186, wherein the measurement device is configured to generate a plurality of files representing the measurement data.*

*203. The system of claim 186, wherein the measurement device is configured to periodically remove and re-attach itself to the computer system.*

* * * * *